United States Patent [19]

Duce

[11] Patent Number: 4,993,539
[45] Date of Patent: Feb. 19, 1991

[54] SCREW FEEDING DEVICES

[75] Inventor: Edward C. Duce, West Yorkshire, England

[73] Assignee: Stockrail International Limited, West Yorkshire, England

[21] Appl. No.: 389,229

[22] Filed: Sep. 18, 1989

[30] Foreign Application Priority Data

Oct. 20, 1988 [GB] United Kingdom ............. 8824562

[51] Int. Cl.$^5$ .............................................. B65G 33/26
[52] U.S. Cl. ..................................... 198/659; 198/657
[58] Field of Search ............... 198/657, 658, 659, 660

[56] References Cited

U.S. PATENT DOCUMENTS

| 2,620,917 | 12/1952 | Dahlberg | 198/659 |
| 2,908,379 | 10/1959 | Hamilton | 198/659 |
| 3,178,010 | 4/1965 | Van Keuren et al. | 198/657 X |
| 3,590,985 | 7/1971 | Hirsch | 198/659 |
| 3,705,644 | 12/1972 | Kawchitch | 198/664 |
| 3,978,816 | 9/1976 | Saloom | 198/659 X |
| 4,014,431 | 3/1977 | Angeletti et al. | 198/660 |

FOREIGN PATENT DOCUMENTS

| 0403984 | 4/1966 | Austria | 198/659 |
| 1214611 | 4/1966 | Fed. Rep. of Germany | 198/659 |
| 1805034 | 7/1970 | Fed. Rep. of Germany | 198/659 |
| 1408277 | 12/1965 | France | 198/659 |

OTHER PUBLICATIONS

Soviet Inventions Illustrated, Sections P,Q, week 8803, Mar. 2, 1988, Derwent Publications Ltd., London, Q 35-SU 1315-369 (Abstract).

Primary Examiner—H. Grant Skaggs
Assistant Examiner—James R. Bidwell
Attorney, Agent, or Firm—Klauber & Jackson

[57] ABSTRACT

The invention provides a length of feed screw for connection between two straight lengths of screw conveyor, the length of feed screw being of a material which can be flexed, but being slotted to facilitate bending of the length of feed screw so that the length of feed screw can continue to operate in the bent condition.

6 Claims, 2 Drawing Sheets

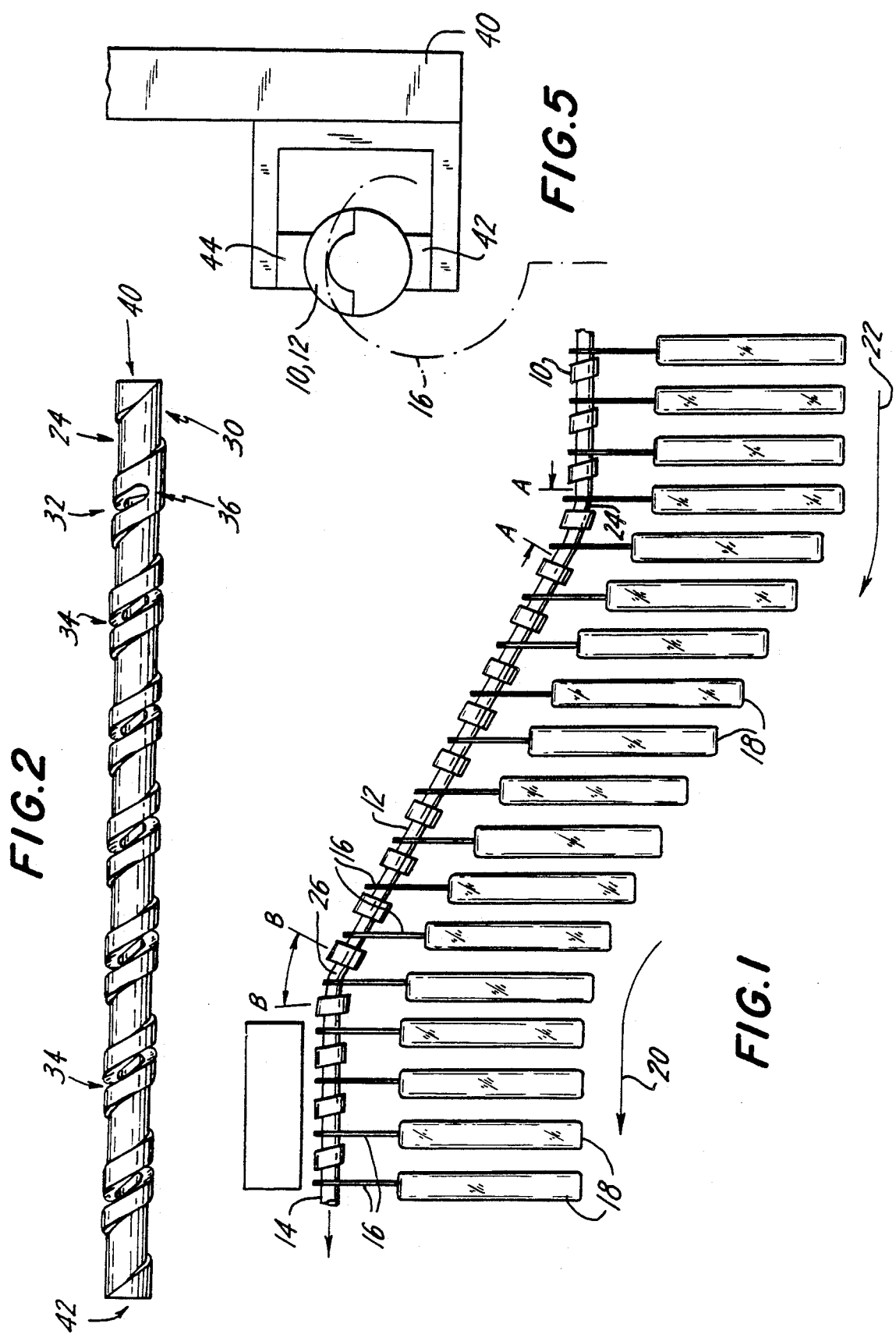

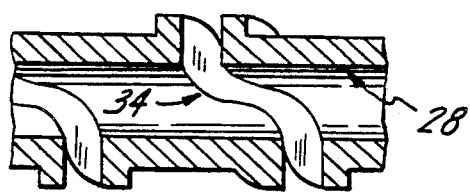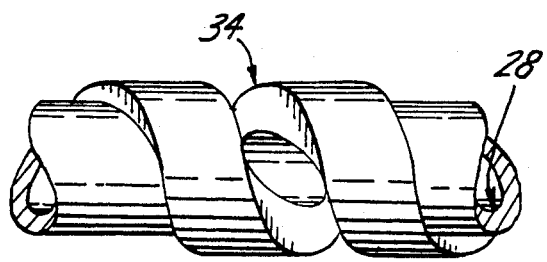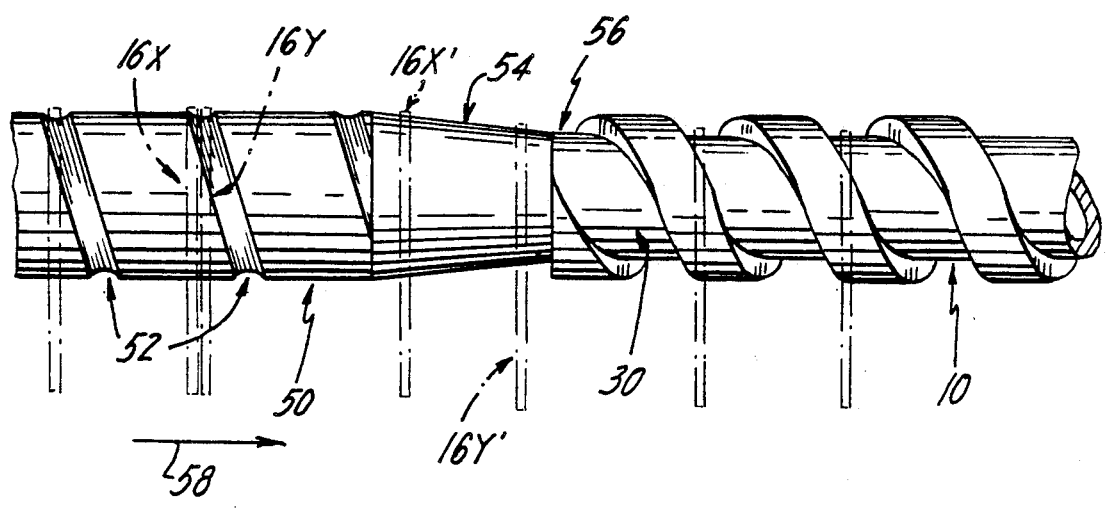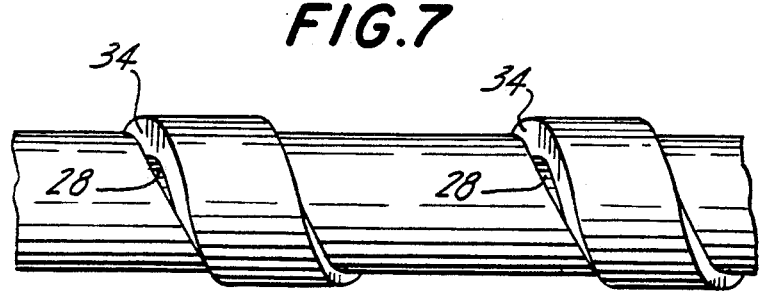

SCREW FEEDING DEVICES

This invention relates to screw feeding devices, and concerns a feed screw sometimes referred to as an archimedian screw, the purpose of which is to transport suspended articles, for example garments suspended on hangers, in a direction lengthwise of the feed screw.

Feed screws for the above purpose are of course well known, and are used extensively in the storage and sortation systems commonly employed in factories and warehouses for the storage and sortation of garments suspended by hangers. The screws generally are arranged horizontally or in inclined fashion and are rotated for the feeding of the hangers suspended in the threads of the screw. Such systems are used extensively in the storage and sortation of garments, and a particular system utilising feed screw devices is disclosed in our copending British patent application No. 8821667.6.

A difficulty which has been experienced using feed screws, is the arranging for the screw to lie in a curved path and yet continue to function whilst it is rotated. The difficulty of geometry can be understood. If the screw is made of flexible material, when it is bent into curved form, the flexible material will bunch at the inner side and stretch at the outer side of the curve. If the feed screw is of rigid material then of course the bending of same is not possible.

Accordingly, where it is desired to create a curve in the feed track of a storage or sortation system using feed screws, at the curved region it has usually been necessary to provide an alternative feeding mechanism such as a sprocket and chain arrangement or simply a smooth guide or perhaps a screw type arrangment which is of modified form such as comprising a flexible core shaft on which is wound a wire defining the screw thread. Even this latter construction however is not satisfactory.

The present invention seeks to provide a feed screw device which can lie in a curved path and yet is capable of being rotated about it axis whilst remaining in that curved path.

According to the present invention the feed screw device comprises a hollow plastic rod which is of a material capable of some resilience in that it is essentially rigid in nature, which is formed on its outer periphery with a helical groove defining threads in which the articles, for example hangers can be suspended, so that there are helical lands between the turns of the thread, and the tube is slotted preferably by means of a continuous helical slot which opens into the bore of the tube.

Preferably, there is a continuous helical slot which passes through said lands

By this arrangement it can be seen that the provision of the slot gives the feed screw the capability of considerably more bendability, because when the feed screw is curved the said slot closes at the inner edge of the curve, and opens at the outer side of the curve whereby the feed screw is capable of being driven about its axis whilst remaining in curved form. To this end, the feed screw may be provided with a core shaft which is bendable, but which forms a drive for example between the ends of a pair of straight feed screw devices lying at an angle to each other and connected by the feed screw device according to the invention, so that articles suspended on the straight feed screws can be transported one from the other along the feed screw device according to the invention.

It will also be noticed that by providing the slot in the lands of a feed screw device according to the invention, there is no variation in the thread width of a feed screw when it is moved to the curved configuration, although the slot can be provided in the thread root adjacent the lands, with equally good results.

A curved feed screw according ot the invention may be arranged to form a junction piece between a horizontal feed screw and a straight and upwardly or downwardly inclined feed screw whereby the suspended article may be passed from a lower level to a higher level or vice versa. Also the feed screw device may be used for connecting feed screw sections which lie in the same horizontal plane but at an angle to each other, or indeed even parallel to each other.

An embodiment of the invention will now be described, by way of example, with reference to the accompanying diagrammatic drawings, wherein:

FIG. 1 shows a length of screw conveyor for the conveying of individual garments suspended from the screw conveyor by means of hangers;

FIG. 2 is a side view in enlarged scale showing the section of screw which forms each of the curved portions shown in FIG. 1;

FIG. 3 is a sectional elevation to an even larger scale of a part of the feed screw portion shown in FIG. 2;

FIG. 4 is a side view of the part shown in FIG. 3;

FIG. 5 is an end view showing how the screw conveyor shown in FIG. 1 is supported;

FIG. 6 is a side view showing an in-feed arrangement for the feed screw shown in FIG. 1; and FIG. 7 is a view similar to FIG. 4, but showing an alternative form of the invention.

Referring to FIG. 1, part of a screw conveying system is shown. The system may be for example for garment sortation whereby garments are bunched into groups by automatic means or the like for example as described in our co-pending British patent application No. 8807878.7 or 8807877.9. The part of the screw conveyor system shown in FIG. 1 comprises a first horizontal screw conveyor length 10, a second straight screw conveyor length 12 which is upwardly inclined as shown, a third screw conveying length 14 which is also straight and horizontal, but which is located at a higher level than the length 10. Each of the lengths 10, 12, and 14 is of conventional construction, or is constructed as described in our co-pending European patent application No. 88112856.5, but in any event is provided with a screw thread in which coat hangers 16 locate so that as the entire screw conveyor is rotated, by a means not shown, so the hangers 16 and the garments 18 supported thereby are fed in the direction of the length of the screw conveyor as indicated by the arrows 20 and 22.

Connecting the lengths 10, 12 and 12, 14 are curved screw conveyor sections 24 and 26 which respectively subtend the angles A—A and B—B as shown in FIG. 1. The lengths 10, 12 and 14 are of the same diameter and the sections 24 and 26 are also of the same diameter and are the same as sections 10, 12 and 14 to enable the smooth conveying of the hangers and garments 16, 18.

The present invention in its first aspect provides for a specific form of construction for the sections 24 and 26, and referring now to FIGS. 2 to 4, section 24 is shown in side elevation in FIG. 2. Section 26 is in fact identical.

As can be seen from FIG. 2, the section 24 comprises an elongated member which is a tube having a bore 28.

The tube is of plastics material, and is machined so as to define the screw thread 30 on the outer surface of the tube and so that between the turns of the thread 30 there are "lands" 32. In order to make the tube bendable so that it can subtend an angle such as A—A or B—B, which could not otherwise be done because of the rigid nature of the plastics material of the tube, a slot is made in this embodiment in the lands 32, which slot is indicated by reference 34 and is a continuous helical slot extending from ends 36 which are located inwardly of the ends 40 of the section 24. The slot 34 extends to the bore 28 as shown in FIGS. 3 and 4, and this construction gives the section 24 the capability of bending quite freely and when section 24 is curved, the slot 34 at the inner side of the curvature closes whereas it opens slightly at the outer side of the curvature so that there is no reduction in width in the thread 30. Also by this construction the section 24 can rotate about a curved axis enabling the continuity of the screw thread conveying arrangement as shown in FIG. 1.

To the inside of the tube portion 24 there may be provided a reinforcing core of spring steel wire which can be helically wound or can be made up of parallel strands of wire. The thread 30 at the ends of the section 24 will have to be angularly arranged so as to match the threads at the ends of the lengths 10, 12 and 14 which are connected by the sections 26.

The section provided with the slot may be arranged to connect lengths of screw or scroll conveyor which lie in the same horizontal plane but at an angle or indeed which lie parallel, in which case the slotted section would have to be capable of being bent through 90° or 180°.

This aspect of the invention therefore provides an extremely useful screw conveying section which is capable of being bent through an angle and will continue to rotate about a curved axis when in use. In this connection the section which has the slot can of course be made integral with a straight section or length such as 10, 12 or 14. The slot 34 can be made by means such as by machining or the like. In the embodiment of FIG. 7, wherein the same reference numerals are used for parts already described, the slot 34 lies in the root of the thread, adjacent the lands and again extends into the bore as shown. This embodiment functions equally well.

FIG. 5 has been included to show how the screw or scroll conveyor lengths 10, 12, 14 are supported by means of brackets 40 provided with bearing pads 42 and 44 which engage frictionally on the top and bottom of the conveyor length, but leaving the conveyor length open at one side so that the hangers 16 can be supported on the scroll conveyor length while still being capable of moving therealong and past the supporting brackets 40.

Referring now to FIG. 6 which shows a further novel improvement which can be embodied in a screw conveying system, a feed-in device is illustrated. The feed-in device comprises a circular bar 50 with shallow helical grooves 52 leading to a truncated conical section 54. The smaller end of the conical section 54 couples with an end 56 of a scroll conveyor length such as length 10 shown in FIG. 1 so that the diameter of the smaller end of the truncated portion 54 is equal to the core diameter of the thread 30. This feed-in device is utilised in order to achieve separation of a pair of hangers which may undersirably become positioned in contact and in the same turn of the groove 52 as illustrated by hangers 16X and 16Y. As the assembly turns, the pair of hangers 16X and 16Y are moved together in the direction of arrow 58 until they reach the truncated portion 54, when in actual fact they separate by the rotational feed and the gravity effect of the cone 54 and become spaced as indicated by hangers 16X' and 16Y'. The hangers therefore arrive individually at the end of the scroll length 10, and the individual hangers are therefore picked up one per turn of the screw. This is quite important in relation to the automatic system which is utilised for subsequently controlling the positioning and sortation of the garments supported by the hangers as it is important that there should be only one hanger per turn of the screw as when the hangers enter the detection system, their positions are accurately monitored. The concept of the feed device of which an embodiment is shown in FIG. 6 constitutes another aspect of the present invention.

I claim:

1. A feed screw device for transporting articles, said device comprising:
   (a) a hollow rod of a rigid plastic material, said rod including an outer periphery;
   (b) a raised helical land along the outer periphery of the hollow rod;
   (c) a helical groove which is defined between the land and from which articles may be suspended; and
   (d) a continuous helical slot which opens into the bore of the rod and imparts to said rod a degree of resilience sufficient for it to form a curve of a required shape.

2. A resilient feed screw according to claim 1 connected at least at one end to a length of straight feed screw such that suspended articles can be transferred between said feed screws.

3. A feed screw according to claim 1, wherein the continuous slot passes through said lands.

4. A feed screw according to claim 1, wherein the continuous slot is formed in the rod at positions between the land.

5. A feed screw according to any preceding claim, wherein the feed screw includes a bendable core shaft.

6. A feed screw according to claim 2, wherein two straight feed screw sections are connected to respective ends of the resilient feed screw, said straight feed screw sections lying at an angle to each other.

* * * * *